US012728634B2

(12) United States Patent
Hayashi et al.

(10) Patent No.: US 12,728,634 B2
(45) Date of Patent: Sep. 8, 2026

(54) PRINTING DEVICE AND NON-TRANSITORY COMPUTER- READABLE RECORDING MEDIUM THEREFOR

(71) Applicant: BROTHER KOGYO KABUSHIKI KAISHA, Nagoya (JP)

(72) Inventors: Masahiro Hayashi, Nishio (JP); Satoru Arakane, Nagoya (JP); Tomohiro Nodsu, Seto (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 56 days.

(21) Appl. No.: 17/707,105

(22) Filed: Mar. 29, 2022

(65) Prior Publication Data

US 2022/0314607 A1 Oct. 6, 2022

(30) Foreign Application Priority Data

Mar. 31, 2021 (JP) ................................ 2021-060317

(51) Int. Cl.
*B41J 2/045* (2006.01)

(52) U.S. Cl.
CPC ....... *B41J 2/04541* (2013.01); *B41J 2/04588* (2013.01); *B41J 2/04593* (2013.01); *B41J 2/04596* (2013.01)

(58) Field of Classification Search
None
See application file for complete search history.

(56) References Cited

U.S. PATENT DOCUMENTS

2004/0109035 A1* 6/2004 Otokita ................ B41J 2/17566 347/5
2004/0122812 A1* 6/2004 Yoshimura ............ H04L 69/329
2007/0031160 A1 2/2007 Kondo
2010/0002039 A1 1/2010 Kikuchi et al.
2012/0327436 A1* 12/2012 Orikasa ................. G06F 3/1247 358/1.9
2016/0011827 A1 1/2016 Webb et al.
2017/0063646 A1* 3/2017 Kawai .................... G06Q 10/10
2019/0317703 A1* 10/2019 Yamada .................. G06F 3/122

(Continued)

FOREIGN PATENT DOCUMENTS

JP 2004-358663 A 12/2004
JP 2007-43494 A 2/2007
JP 2009-18495 A 1/2009

(Continued)

OTHER PUBLICATIONS

Notice of Reasons for Refusal dated Oct. 25, 2024 received from the Japanese Patent Office in JP counterpart 2021-060317 together with English language translation.

*Primary Examiner* — Alejandro Valencia
(74) *Attorney, Agent, or Firm* — Scully, Scott, Murphy & Presser, P.C.

(57) ABSTRACT

There is provided a printing device, which includes a print engine provided with an ejection head configured to eject droplets of ink introduced from a container containing the ink and configured to perform printing using the ink droplets on a recording sheet, and a controller. The controller is configured to automatically set a drive signal pattern defining a signal pattern to drive the ejection head in accordance with contract information concluded for the printing device or for a use by a user of the printing device.

24 Claims, 6 Drawing Sheets

(56) References Cited

U.S. PATENT DOCUMENTS

| | | | | |
|---|---|---|---|---|
| 2021/0232878 | A1* | 7/2021 | Takaoka ................ | G06F 3/1219 |

FOREIGN PATENT DOCUMENTS

| | | | |
|---|---|---|---|
| JP | 2011-177932 | A | 9/2011 |
| JP | 2012-56214 | A | 3/2012 |
| JP | 2017-44985 | A | 3/2017 |
| JP | 2017-49767 | A | 3/2017 |

* cited by examiner

| | CONTRACT I | CONTRACT II | CONTRACT III |
|---|---|---|---|
| FOR SMALL DROPLET | DRIVE SIGNAL PATTERN a | DRIVE SIGNAL PATTERN p | DRIVE SIGNAL PATTERN x |
| FOR MEDIUM DROPLET | DRIVE SIGNAL PATTERN b | DRIVE SIGNAL PATTERN q | DRIVE SIGNAL PATTERN y |
| FOR LARGE DROPLET | DRIVE SIGNAL PATTERN c | DRIVE SIGNAL PATTERN r | DRIVE SIGNAL PATTERN z |

FIG. 6

| | CONTRACT IV | CONTRACT V |
|---|---|---|
| FOR MICRO DROPLET | | DRIVE SIGNAL PATTERN s |
| FOR SMALL DROPLET | DRIVE SIGNAL PATTERN g | DRIVE SIGNAL PATTERN g |
| FOR MEDIUM DROPLET | DRIVE SIGNAL PATTERN h | DRIVE SIGNAL PATTERN h |
| FOR LARGE DROPLET | DRIVE SIGNAL PATTERN i | |

FIG. 7

PRINTING DEVICE AND NON-TRANSITORY COMPUTER- READABLE RECORDING MEDIUM THEREFOR

CROSS-REFERENCE TO RELATED APPLICATIONS

This application claims priority under 35 U.S.C. § 119 from Japanese Patent Application No. 2021-060317 filed on Mar. 31, 2021. The entire subject matter of the application is incorporated herein by reference.

BACKGROUND

The present disclosures relate to a printing device equipped with an ink ejection head configured to eject ink and a non-transitory computer-readable recording medium containing computer-executable instructions realizing a print control program.

Conventionally, there has been known a printing device equipped with an ink ejection head, in which control information of an ink ejection waveform is stored in a memory chip of an ink cartridge, and the ejection of ink droplets is controlled based on the control information obtained from the memory chip.

SUMMARY

There are cases where the user of a printing device concludes a contract with a service provider that owns the printing device, in which a user pays a fee in accordance with printed contents. Recently, such contracts are becoming more and more diverse, with some involving large volumes of printing and others requiring low costs. Therefore, there is a growing need to control the ink ejection suitable for such a variety of contracts.

According to aspects of the present disclosures, there is provided a printing device, which includes a print engine provided with an ejection head configured to eject droplets of ink introduced from a container containing the ink and configured to perform printing using the ink droplets on a recording sheet, and a controller. The controller is configured to automatically set a drive signal pattern defining a signal pattern to drive the ejection head in accordance with contract information concluded for the printing device or for usage by a user of the printing device.

According to aspects of the present disclosures, there is provided a non-transitory computer-readable recording medium for a printing device equipped with a print engine provided with ejection head configured to eject droplets of ink introduced from a container containing the ink and configured to perform printing using the ink droplets on a recording sheet and a controller. The non-transitory computer-readable recording medium contains computer-executable instructions which cause, when executed by the controller, the printing device to automatically set a drive signal pattern defining a signal pattern to drive the ejection head in accordance with contract information concluded for the printing device or for usage by a user of the printing device.

The drive signal pattern is automatically set according to the contractual information of the contract. According to the configuration, since the ejection head is driven by the drive signal pattern according to the concluded contract content, the printing service can be flexibly optimized in response to the contract.

BRIEF DESCRIPTION OF THE DRAWINGS

FIG. 6 is a table showing an example of a relationship between contracts and drive signal patterns, respectively.

FIG. 7 is a table showing another example of a relationship between contracts and drive signal patterns, respectively.

DETAILED DESCRIPTION

Hereinafter, referring to accompanying drawings, a printer according to the present disclosures will be described. The printer can be used in a retail business, in which the user purchases the printing device, installs the ink cartridge and uses the same. The printer can also be used in a subscription business, in which a user pays a fee to a service provider that owns the printing device.

Overall Configuration of Printer

Figure 1:
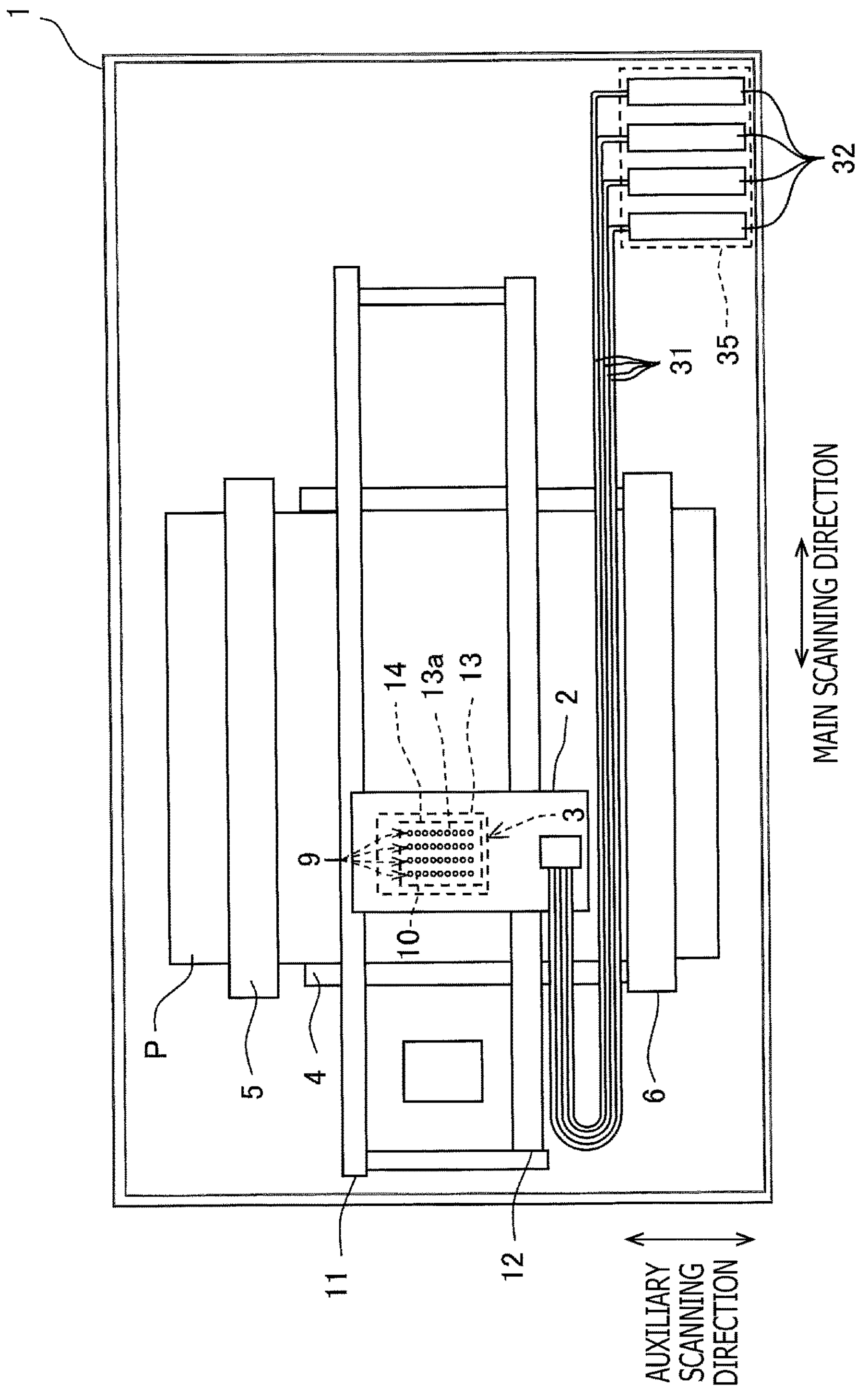
FIG. 1 schematically shows a structure of a printer.

The printer 1 will be described in detail with reference to FIGS. 1 and 2. The printer 1 is owned, for example, by a provider of a printing service. As shown in FIG. 1, the printer 1 has a carriage 2, an inkjet head 3, a platen 4, and conveyance rollers 5 and 6.

The carriage 2 is secured to a belt (not shown), and the belt is connected to a carriage motor 56 (see FIG. 2) such that, when the carriage motor 56 is driven, the belt is moved and the carriage 2 is moved along guide rails 11 and 12 in a main scanning direction. In the following description, the main scanning direction and an auxiliary scanning direction, which are indicated in FIG. 1, are referred to when a moving direction of the carriage 2, a conveying direction of a recording sheet P, and the like are described.

Figure 2:
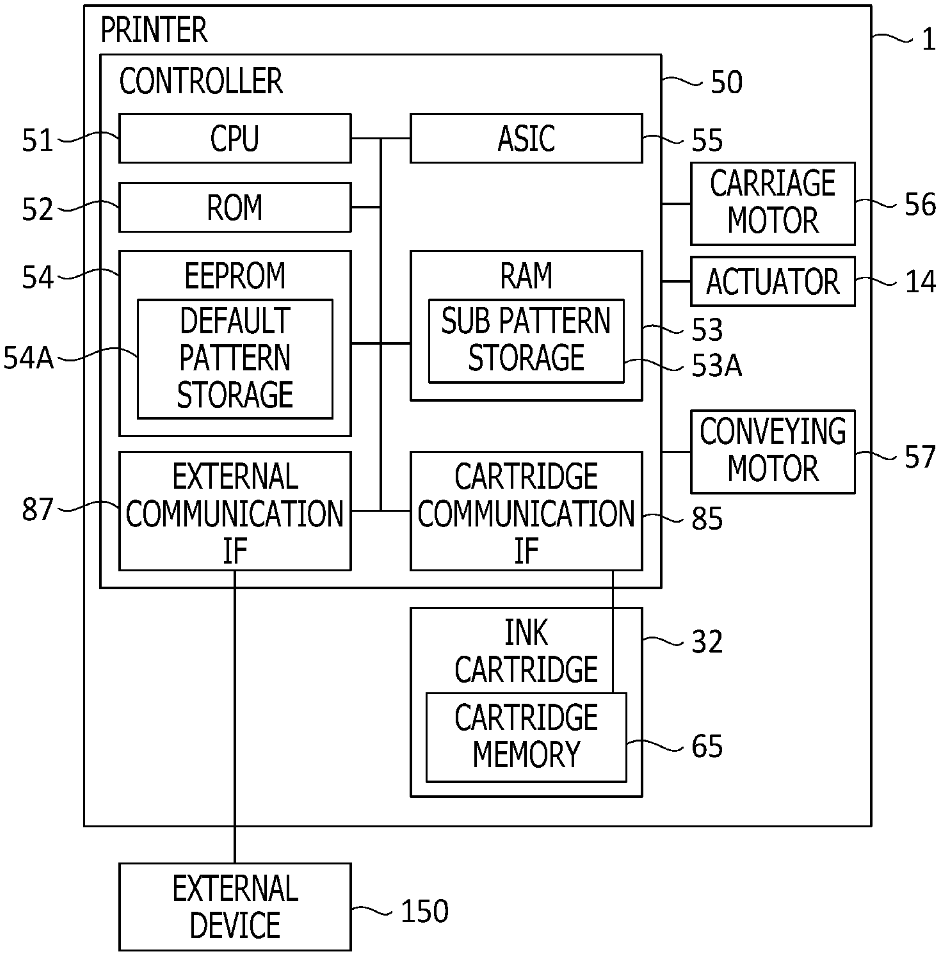
FIG. 2 is a block diagram showing an electric configuration of the printer.

The inkjet head 3 is mounted on the carriage 2 (see FIG. 2). The inkjet head 3 is equipped with a channel unit 13 and an actuator 14.

The channel unit 13 has ink flow paths that include multiple nozzles 10 formed on a nozzle surface 13*a* which is a lower surface of the channel unit 13. The multiple nozzles 10 are arranged such that a particular number of multiple nozzles are linearly aligned in a conveying direction (i.e., an up-down direction in FIG. 1), each forming a line of nozzle array 9, and multiple lines of nozzle arrays 9 are aligned in the main scanning direction (i.e., a right-left direction in FIG. 1), thereby multiple nozzle arrays 9 being formed. According to an example shown in FIG. 1, four lines of nozzle arrays 9, the four lines being aligned in the main scanning direction, are formed on the nozzle surface 13*a* of the channel unit 13.

The actuator 14 has multiple electrodes, and a driving pulse signal is applied to each of the multiple electrodes, thereby ejection energy being applied individually to the ink retained in each nozzle 10.

As shown in FIG. 1, the inkjet head 3 is connected to four ink tubes 31. The four ink tubes 31 are connected to four ink cartridges 32 arranged, on the printer 1, in the main scanning direction, respectively. Black, yellow, cyan, and magenta ink stored in the four ink cartridges 32 are supplied to the inkjet head 3 through the four ink tubes 31, respectively. The four ink cartridges 32 are detachably attached to a cartridge holder 35, respectively.

The platen 4 is arranged below the inkjet head 3 and is configured to face the nozzle surface 13*a* when printing is performed. The platen 4 extends in the main scanning direction, over an entire width of the recording sheet P, and is configured to support the recording sheet P from below. The conveying rollers 5 and 6 are connected to a conveying motor 57 (see FIG. 2) via a gear train (not shown). The conveying rollers 5 and 6 are rotated as the conveying motor 57 is driven to rotate, and convey the recording sheet P in the conveying direction (i.e., the auxiliary scanning direction).

According to the above configuration, whenever the recording sheet P is conveyed, by the conveying rollers 5 and 6, by a particular distance in the conveying direction (i.e., the auxiliary scanning direction), the printer 1 performs printing on the recording sheet P by moving the carriage 2 in the main scanning direction and causing the multiple nozzles 10 of the inkjet head 3 to eject the ink droplets.

Electrical Configuration of Printer

Next, an electrical configuration of the printer 1 will be described with reference to FIG. 2. Operations of the printer 1 are controlled by a controller 50.

The controller 50 consists of a CPU 51, a ROM 52, a RAM 53, an EEPROM 54, an ASIC (Application Specific Integrated Circuit) 55, a cartridge communication IF 85, and an external communication IF 87. Configured as above, the controller 50 is configured to perform controlling of the carriage motor 56, the actuator 14, and the conveying motor 57.

In the ROM 52, a print control program of the printer 1 is stored. In the RAM 53, temporary data such as temporary process data is stored. In the EEPROM 54, data to be retained even if the printer 1 is powered OFF is stored.

The cartridge communication IF 85 is configured to communicate with the ink cartridges 32 attached to the cartridge holder 35 in accordance with an appropriate communication method. As mentioned above, the printer 1 according to the present disclosures is supposed to be used for either the retail business or the subscription business. The ink cartridges 32 are provided with cartridge memories 65, respectively, and each cartridge memory 65 contains cartridge type information indicating whether the ink cartridge 32 is for the retail business or the subscription business. The cartridge type information also includes an attribute of the ink stored in the ink cartridge 32, the price of the ink cartridge 32 and the like. The cartridge communication IF 85 is configured to obtain the cartridge type information from the cartridge memory 65 of each of the ink cartridges 32.

The external communication IF 87 is communicatively connected to an external device 150 according to an appropriate communication method. Examples of the external device 150 include a server located at the afore-mentioned printing service provider, a manufacturer of the printer 1, a business operator such as the sales company of the printer 1, a user's mobile terminal, and the like. Examples of the communication method are wireless communication including a wireless LAN and network communication, wired communication via a USB cable, and the like. It is noted that the type of wireless communication is not necessarily limited to a particular type, but any of well-known communication types such as Wi-Fi (registered trademark of Wi-Fi Alliance), Bluetooth (registered trademark of Bluetooth SIG), infrared communication and the like may be sufficient.

It is noted that, in FIG. 2, only a single CPU 51 is shown. However, it is possible that the controller 50 may include multiple CPUs 51, and the multiple CPUs 51 may share the processing. Similarly, in FIG. 2, only a single ASIC 55 is shown. However, the controller 50 may include multiple ASICs 55 which may share the process.

One of the most significant features is that, when the installed ink cartridges 32 are for the subscription business, a drive pulse signal (described below) for driving the actuator 14 is determined corresponding to a contract content.

Driving Pulse Signal

In a normal state, the actuator 14 is curved so that a pressure chamber side, where ink is stored, is convex, with the afore-mentioned electrode being set to a particular positive potential. After the electrodes are set to the ground potential at an appropriate timing, the volume of the pressure chamber is expanded, and a pressure wave is generated. Thereafter, the electrodes are set to the positive predetermined potential again at a timing when the pressure wave becomes positive pressure, thereby pressure being applied to the ink in the pressure chamber.

According to the above-described method (i.e., a so-called pulling-and-shooting method), a high ink ejection speed can be obtained with a relatively small driving voltage. In the printer 1, there are several types of driving pulse signal patterns that can be given to the electrodes in advance. Each driving pulse signal is constituted by pulses each having a high level or a low level, and a high-level interval and a low-level interval are different from each other (see FIG. 5). In the following description, a pattern of the driving pulse signal will be referred to in a simplified manner as a "drive signal pattern."

In the present embodiment, an ejection control suitable for the contract content is performed by using a driving pulse signal that matches the contract content, while taking into account the attributes and price of the ink. The ink attribute includes, for example, a viscosity of the ink. Since the actual ink droplets ejected vary depending on the viscosity of the ink used, different drive signal patterns may be used depending on whether the viscosity of the ink used is high or low.

Relationship Between Contract Content and Driving Pulse Signal

The subscription contracts are becoming more and more diverse in recent years, with some involving high volume printing and others requiring a low cost. Typical examples include a period-based billing method, in which a certain amount of money is paid for each particular period of time, for example, every month, and a quantity-based billing method, in which a certain amount of money is paid for each volume of printing, for example, per the number of sheets printed, and the like. Even within each method, detailed restrictions and allowances may be incorporated. Therefore, the need for ink ejection control that is suitable for such various contract contents has arisen.

Generally, the performance of the printer and the attribute of the ink are associated with each other. That is, high-performance printers are generally configured to improve durability, achieve high image quality, and the like, and the drive signal patterns for ejecting the ink are set in the printer on the assumption that relatively expensive ink will be used. In such a case, if a user wishes to sign up for the period-based billing contract using such a high-performance printer, the service provider will be at a significant disadvantage because the user will be able to print almost without limit within a given period of time using expensive ink. According to the present disclosures, in such a case, the drive signal pattern in the printer 1 is changed so that a relatively inexpensive ink can be used instead of the expensive ink mentioned above. In this way, it will be possible to provide printing services under a period-based billing contract while avoiding the above disadvantages for service providers.

Even in the case of a quantity-based billing method contract, it is necessary to change the contract price between cases where the total number of copies printed during the contract period is extremely large and cases where the total number of copies printed during the contract period is relatively small in order for the service provider not to be disadvantaged. In such a case, it is necessary to use a different ink ejection method or a different ink itself in those two cases. Therefore, in this embodiment, same as above, by changing the drive signal patterns and controlling the ink ejection, it is possible to provide printing services under the quantity-based billing method contract while avoiding the disadvantage of service providers.

Even with the quantity-based billing method contract, if a sheet is printed with an extremely large dot count, such as a case where a high-quality photograph or a precise drawing image such as a graph is printed, the same ejection control as for the normal printing including only text, will result in a large consumption of ink and a large disadvantage to the service provider. According to the present disclosures, the drive signal pattern is switched to one for the low-cost side when printing is performed on a sheet with an extremely large dot count as described above, to avoid disadvantages for service providers.

Further, there is a case where, after the user actually starts printing, the number of sheets printed may exceed the number of sheets assumed by the service provider at the beginning of the contract. In such a case, it is necessary to change the ink ejection mode to the low-cost side, as it would be disadvantageous to the service provider if the ink ejection mode is left unchanged. According to the present disclosures, in such a case, at a certain timing, the drive signal pattern is switched to the one on the low-cost side to continue providing printing services while avoiding disadvantages to the service provider.

In addition to the above, there are various other types of subscription contracts. In any case, it could be disadvantageous to the service provider if the drive signal pattern prepared in advance for the printer is used as it is for the content of the subscription contract concluded for the printer. In order to avoid the above, if the subscription fee is set uniformly high, the user may have to pay an unreasonably high price for a service that is originally available at a low price. In order to prevent such disadvantages and inconveniences for both the service provider and the user, the present embodiment and modifications described below set the drive signal pattern of the printer 1 according to the content of the subscription contract concluded.

Drive Signal Pattern Storage

In the printer 1 according to the present embodiment, a default pattern storage MA is provided to the EEPROM 54. In the default pattern storage 54A, a particular default drive signal pattern that is initially associated with the printer 1 (hereinafter, referred to as a "default pattern") is stored in a non-rewritable manner. It is noted that the number of the stored default pattern is not necessarily limited to one but a plurality of default patterns may be stored.

On the other hand, a sub-pattern storage 53A is provided in the RAM 53. In this sub-pattern storage section 53A, another drive signal pattern different from the default drive signal pattern described above (hereinafter, referred to as "sub-pattern"), which is prepared by the manufacturer of the printer 1, is stored in a rewritable manner. In the sub-pattern storage 53A, the drive signal pattern corresponding to the contract content is written in place of the above sub-pattern and overwritten and updated according to the contract content concluded by the user who uses the printer 1, as described below.

Figure 3:
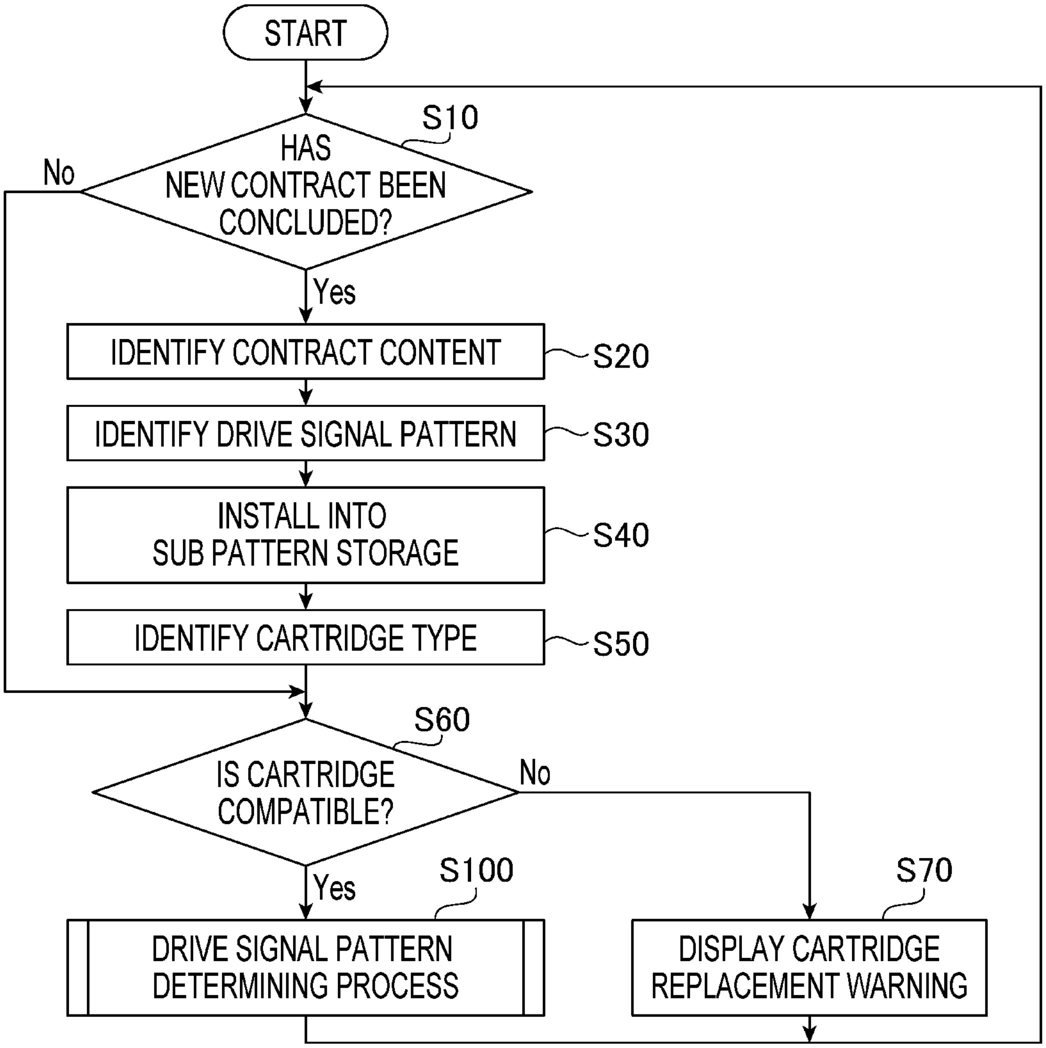
FIG. 3 is a flowchart illustrating a main process to be executed by a CPU of the printer.
Figure 4:
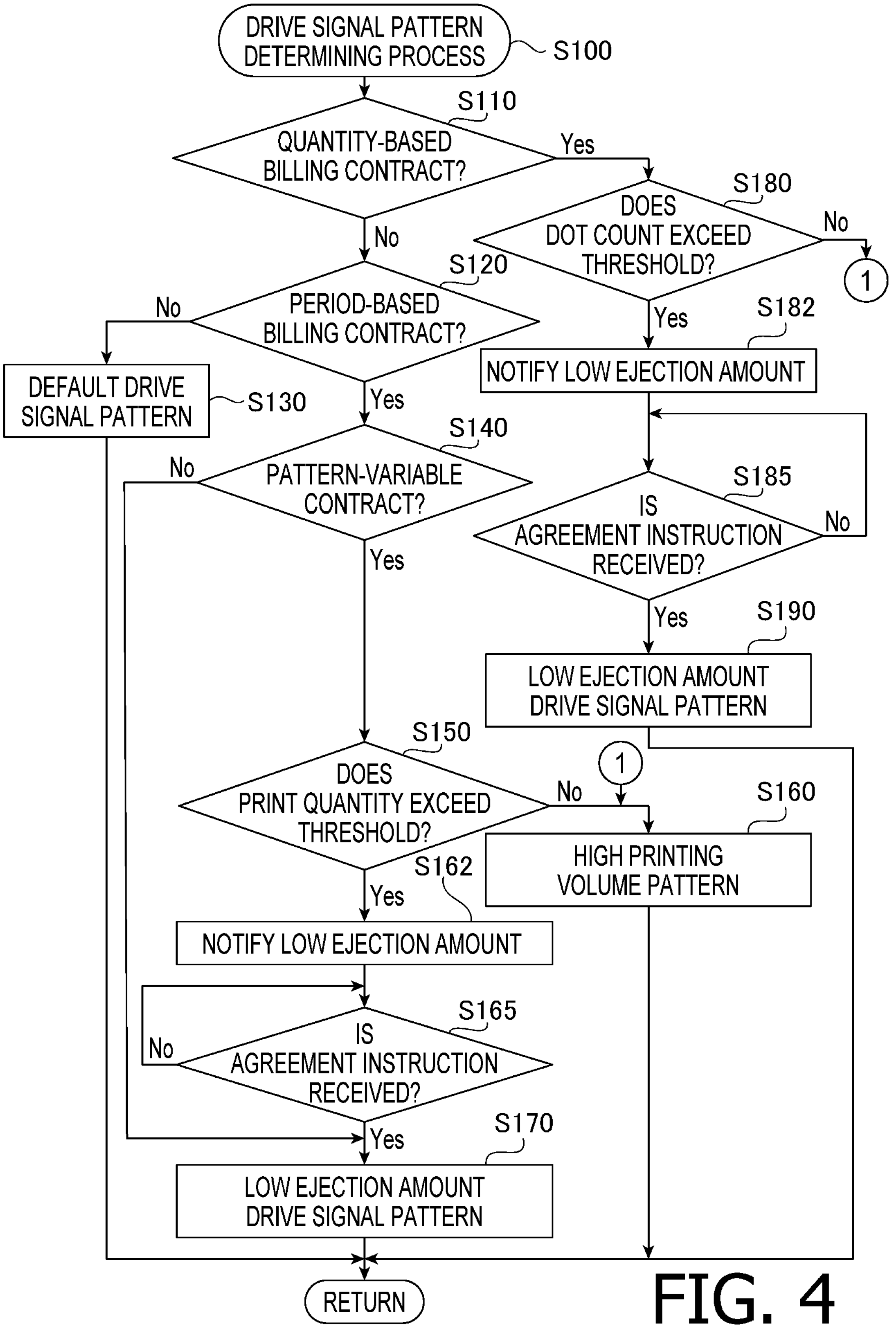
FIG. 4 is a flowchart illustrating details of a drive signal pattern determining process.

The control procedure executed by the CPU 51 to realize the above method is explained, referring to the flowcharts shown in FIGS. 3 and 4. This control procedure is executed by the print control program included in the plurality of programs stored in the above ROM 52. By executing the control procedure, the following print control method according to this embodiment is realized.

First, in S10, the CPU 51 determines whether or not a particular instruction indicates that a new contract has been concluded (hereinafter, referred to as a "contract instruction"). The contract may be the contract concluded for the printer 1, or for the usage by the user of the printer 1. This instruction is obtained, for example, by receiving contract information from the external device 150 via wireless or wired communication as described above. Alternatively, the contract information may be obtained as the user input the contract information through operation at a suitable operation device (e.g., an operation panel) provided to the printer 1.

In particular, in this case, the printer 1 may be operated in a so-called offline state where the printer 1 is not connected to the external device 150 via the external communication IF 87, and the contract information may be entered by the user operation of the operation panel as described above. An operator who operates the operation panel is not necessarily limited to the user but may be a business operator who provides the aforementioned printing service or a service person of the manufacturer or sales company of the printer (the same applies hereinafter). The contract information obtained here is information indicating the contract content that has been concluded, and includes, for example, information indicating the type of payment methods, such as the quantity-based billing method or the period-based billing method described above, and the amount of money the user pays to the service provider. When it is determined that the contract instruction is obtained (S10: YES), the CPU 51 advances the process to S20, while, when it is determined that the contract instruction is not obtained (S10: NO), the CPU 51 proceeds to S60.

In S20, the content of the contract, for which the contract instructions were obtained in S10, is identified. In this way, for example, whether the contract is a quantity-based billing method contract (hereinafter, referred to as a "quantity-based billing contract") or a period-based billing method contract (hereinafter referred to as a "period-based billing contract") can be identified.

Next, in S30, the drive signal pattern corresponding to the contract content and identified in S20 is identified. For example, in the case of a quantity-based billing contract, a drive signal pattern in which the driving pulse signal is pre-arranged so that the ink density becomes relatively thin (hereinafter, referred to as a "pattern for high printing volume") is first specified to correspond to the case where the user performs printing on a large number of recording sheets P. In addition, according to the details of the quantity-based billing contract, a drive signal pattern in which the above driving pulse signal is pre-arranged so that the ink ejection amount becomes relatively low (hereinafter referred to as a "low ejection amount pattern") may also be specified in preparation for the case where the user performs printing on a large number of recording sheets P up to the upper limit specified in the contract. If the contract is the period-based billing contract, it is assumed that the user will print a large amount of data during the period specified in the contract, so the pattern for high print volume is specified in the same way as above. In addition, if the contract allows the drive signal pattern to be varied according to the amount of printing during that period, the low ejection amount pattern is also specified as above. If the contract is neither the quantity-based nor the period-based billing contract, the default pattern described above is specified.

Then, the process proceeds to S40, and as the printer 1 accesses the external device 150 via the external communication IF 87, the drive signal pattern identified in S30 is obtained by downloading the same from the external device 150, and is installed in the sub-pattern storage 53A of the RAM 53.

According to the present embodiment, a plurality of the above sub-patterns, i.e., the high printing volume pattern and the low ejection amount pattern, are both stored in the sub-pattern storage 53A. When a memory capacity of the sub-pattern storage 53A is not so large, only one of the sub-patterns is stored in the sub-pattern storage 53A. Alternatively, instead of storing the default pattern in the default pattern storage 54A of the EEPROM 54, the default pattern may be stored in the RAM 53. In such a case, when the memory capacity of the sub-pattern storage 53A is not so large, the default pattern stored in the RAM 54 is deleted, and one of the sub-patterns may be stored in a space that is vacated as the default pattern has been deleted.

Thereafter, the process proceeds to S50, where the type of the ink cartridges 32 attached to the cartridge holder 35 is identified based on the above cartridge type information obtained through communication with the cartridge memory 65 via, for example, the cartridge communication IF 85. Thereafter, the process proceeds to S60.

Then, the process proceeds to S60, where it is determined whether or not the type of ink cartridge 32 identified in S50 is compatible with the contract content identified in S20 and the drive signal pattern identified in S30. In other words, in S60, it is checked whether the type of ink cartridge 32 identified in S50 matches the type of ink cartridge 32 that should be attached to the cartridge holder 35 according to the contract content identified in S20. When the type of ink cartridge 32 identified in S50 does not match the type of ink cartridge 32 that should be attached to the cartridge holder 35 (S60: NO), the process proceeds to S70, where a replacement warning indicating that "the ink cartridge should be replaced" is displayed on the display provided to the printer 1, then the process proceeds to S10, and the similar procedure is repeated. It is noted that this warning may be displayed on the external device 150 connected via the external communication IF 87.

On the other hand, when the type of ink cartridge 32 matches the contract content identified in S20 and the drive signal pattern identified in S30 (S60: YES), the process proceeds to S100 to perform the drive signal pattern determining process. In this case, the drive signal pattern determination process of S100 is, in other words, a process in which the drive signal pattern is determined based on the type of ink cartridge 32 to be attached to the cartridge holder 35 according to the contract contents identified in S20.

The drive signal pattern determining process in S100 is described referring to a flowchart shown in FIG. 4. In S110, it is determined whether the contract identified in S20 is the quantity-based billing contract. When the contract is not the quantity-based billing contract (S110: NO), the process proceeds to S120.

In S120, it is determined whether the contract content identified in S20 is the period-based billing contract. When the contract is not the period-based billing contract (S120: NO), the process proceeds to S130.

In S130, the drive signal pattern used for printing is set to the default pattern in response to the contract identified in S20 being neither the quantity-based billing contract nor the period-based billing contract, and the drive signal pattern determining process is terminated, and the process proceeds to S10.

When the contract content identified in S20 is the period-based billing contract (120: YES), the process proceeds to S140. In S140, it is determined whether the details of the period-based billing contract include a contract allowing the drive signal pattern to be varied according to the amount of printing during the period. When the contract allows the drive signal pattern to be varied (S140: YES), the process proceeds to S150.

In S150, it is determined whether or not the number of pages of the printed recording sheets P at this point in time (hereinafter, also referred to simply as "print quantity") exceeds a particular threshold value, which has been set in advance, to a suitable value in order to prevent disadvantages to the service provider that may occur if the amount of printing exceeds the amount of printing that is expected to be done by the user for a period of time specified in the contract, for example. Until the amount of printing does not exceed the threshold (S150: NO), the process proceeds to S160.

In S160, the drive signal pattern to be used for printing is set from among the drive signal patterns that were obtained and installed in S40 as described above. In S160, concretely, the drive signal pattern used for printing is set to the above-mentioned high printing volume pattern, which is pre-arranged so that the ink density becomes relatively thin, corresponding to the case where the user prints a large number of prints in response to the quantity-based billing contract as described above. If a drive signal pattern different from the high print volume pattern has been set prior to the setting of the high print volume pattern, the drive signal pattern used for printing is automatically changed from the different drive signal pattern to the high print volume pattern in S160. The term "change" here means to replace the drive signal pattern used for printing, while the default pattern stored in the default pattern storage 54A of EEPROM 54, as described above, is retained without being replaced. Therefore, in this case, the above different drive signal pattern is an example of a first drive signal pattern, and the pattern for high printing volume is an example of a second drive signal pattern. Thereafter, the process is terminated, and the process proceeds to S10.

On the other hand, at S150, when the printing volume at this point of time exceeds the threshold value (S150: YES), the process proceeds to S162. In S162, since it is possible that the printing volume largely exceeds the printing volume initially estimated, an advance notice informing the user that the drive signal pattern to be used for printing is to be changed to the above-mentioned low ejection amount pattern arranged to have a relatively lower ejection amount is sent to the user. Concretely, the advance notice is transmitted to the external device 150, with which the user can recognize the advance notice, for example, via the external communication IF 87. When the user is in the vicinity of the printer 1, the above advance notice may be given on the display provided to the printer 1.

When the user who recognizes the advance notice performs an appropriate operation on the external device 150 to indicate agreement to the change to the above-mentioned low ejection amount pattern, the CPU 51 obtains an instruction corresponding to the operation via the external communication IF 87. Alternatively, when the advance notice is given on the display of the printer 1, the user performs an appropriate operation on an operation panel of the printer 1 to indicate agreement to the change to the above-mentioned low ejection amount pattern, the CPU 51 obtains the instruction corresponding to the operation.

By obtaining the indication from the external device 150 or corresponding to the operation of the operation panel as described above, an affirmative decision is made in S165 following S162, and the process proceeds to S170.

In S170, the drive signal pattern to be used for printing is set from among the drive signal patterns that were obtained and installed in S40 as described above. Concretely, in S170, the drive signal pattern used for printing is changed to the low ejection amount pattern described above. In this case, just before S150 is determined to be affirmative, the pattern that was set to the high printing volume pattern in S160 as a negative decision is made in S150 is automatically changed to the low ejection amount pattern in S170. In this case, among the high printing volume pattern and the low ejection amount pattern downloaded in S40 and installed in the sub-pattern storage 53A, the high printing volume pattern is used at first, and after the affirmative determination in S170, the drive signal pattern to be used is automatically changed to the low ejection amount pattern.

The term "change" here means to replace the drive signal pattern used for printing, while the default pattern stored in the default pattern storage 54A of the EEPROM 54 as described above is retained without being replaced. Therefore, in this case, the high ejection amount pattern is an example of a first drive signal pattern, and the low ejection amount pattern is an example of a second drive signal pattern. After the completion of S10, the process is terminated and proceeds to S10.

On the other hand, if the details of the period-based billing contract are not such that the drive signal pattern can be varied according to the amount of printing during the period (S140: NO), the process directly proceeds to S170 to change the drive signal pattern used for printing to the low ejection amount pattern. In this case, however, when another drive signal pattern other than the low ejection amount pattern was set before the low ejection amount pattern is set, the drive signal pattern to be used for printing is automatically changed from the other drive signal pattern to the low ejection amount pattern in S170. The term "change" here means to replace the drive signal pattern used for printing, while the default pattern stored in the default pattern storage 54A of the EEPROM 54 as described above is retained without being replaced.

In addition, in S110 above, it is determined whether or not the contract identified in S20 is the quantity-based billing contract. When the contract is the quantity-based contract (S110: YES), the process proceeds to S180. In S180, based on the print data separately obtained from the external device 150 or the like, it is determined whether or not the count value of the number of printing dots (hereinafter referred to as a "dot count" as appropriate) exceeds a particular threshold value in the print content for the recording sheet P that is about to be printed next. As mentioned above, this threshold value is set, in advance, to a suitable value to prevent disadvantages to the service provider when printing is performed in which the dot count becomes extremely large, for example, high-quality photographs or precision drawing images such as graphs. In this case, the threshold value may be changed for color printing and for monochrome printing.

It is noted that the decision may be made based on, instead of the dot count but other values as long as they represent physical property values, state values, or the like that correspond to the amount of ink used. If the printing is not of the above-mentioned photographic or precise drawing images, and the dot count does not exceed the above-mentioned threshold (S180: NO), the process proceeds to S160, and the drive signal pattern used for printing is set to the above-mentioned high printing volume pattern.

If the printing is of the above-mentioned photographic or precise drawing image, and the dot count exceeds the threshold mentioned above (S180: YES), the process proceeds to S182. In S182, as in S162, corresponding to the fact that the dot count may greatly exceed the initially assumed one, an advance notice indicating that the drive signal pattern used for printing is to be changed to the above-mentioned low ejection amount pattern is sent to the external device 150 via, for example, the external communication IF 87. As described above, the above advance notice may be given on the display of the printer 1.

In the same way as in S162, when the user who recognizes the advance notice operates the external device 150 or the operation panel to indicate that the advance notice is recognized, the CPU 51 obtains the instruction corresponding to the operation (S180: YES), and the process proceeds to S190.

In S190, the drive signal pattern to be used for printing is set from among the drive signal patterns that were obtained and installed in S40 as described above. Concretely, in S190, as in S170 above, the drive signal pattern used for printing is set to the low ejection amount pattern. In S190, in response to the printing content on the recording sheet P to be printed at this point of time greatly exceeding the assumed dot count range, the drive signal pattern used for printing on the recording sheet P is set to the low ejection amount pattern in which the ink ejection amount is arranged to be relatively low. In this case, just before an affirmative decision is made in S180, a negative decision is made in S180, and the pattern is set to the high printing volume pattern in S160, but it is automatically changed to the low ejection amount pattern in S190.

In this case, among the high printing volume pattern and the low ejection amount pattern downloaded in S40 and installed in the sub-pattern storage 53A, the high printing volume pattern is used at first, and then the drive signal pattern used is automatically changed to the low ejection amount pattern after an affirmative decision is made in S180. The term "change" here means to replace the drive signal pattern used for printing, while the default pattern stored in the default pattern storage 54A of the EEPROM 54 as described above is retained without being replaced. After the completion of S10, the process terminates the process and proceeds to S10.

Effects

As described above, in the printer 1 according to the present embodiment, the ink is introduced into the inkjet head 3 from the ink cartridges 32, and the ink is ejected from the inkjet head 3 onto the recording sheet P for printing.

A particular contract has been concluded, in advance, for the printer 1 or for the use by the user of the printer 1. The inkjet head 3 that ejects ink is driven by a drive signal pattern, which is automatically set according to the contract information corresponding to the above contract (see S110 to S190 in FIG. 4). According to the present embodiment, since the inkjet head 3 is driven by the drive signal pattern according to the content of the concluded contract, it is possible to provide printing services optimized with flexibility corresponding to the contract.

In this embodiment, the type of ink cartridges 32 to be attached to the cartridge holder 35 is determined in advance corresponding to the contract information representing the contract contents (see S50 and S60). In the signal pattern setting process, the drive signal pattern is set corresponding to the type of ink cartridges 32 to be attached. According to this embodiment, it is possible to provide an optimized printing service corresponding to the type of ink cartridges 32 used in the concluded contract.

According to the above-described embodiment, at least one type of drive signal pattern is stored, in advance, in the EEPROM 54 or the RAM 53. In S160, S170, and S190 of FIG. 4, the drive signal pattern previously stored in EEPROM 54 or RAM 53 is changed to another drive signal pattern according to the contract information. According to the present embodiment, an optimized printing service can be provided by changing the drive signal pattern stored in the EEPROM 54 or the RAM 53 to the one corresponding to the contract. The above "change" may be realized by transforming or adjusting a part of the driving pulse signal waveform of the original drive signal pattern, instead of replacing it with a completely different drive signal pattern as described above.

In the present embodiment, a default pattern and another drive signal pattern that is not the default pattern are stored in the EEPROM 54 or the RAM 53 in advance. In S160, S170, and S190 of FIG. 4, the above default pattern stored in the EEPROM 54 or the RAM 53 is not changed, but another drive signal pattern that is not the default pattern is changed to the drive signal pattern corresponding to the contract. According to this embodiment, the default pattern stored in the EEPROM 54 or the RAM 53 can be preserved without changing the same, while providing an optimized printing service.

In the present embodiment, the printer 1 is equipped with the external communication IF 87. As S40 is executed after the contract is concluded and the contract contents are identified in S20, another drive signal pattern that is not the default pattern can be obtained from the external device 150 through communication via the external communication IF 87. Instead of obtaining new drive signal patterns from the outside to make the above changes, the drive signal patterns prepared in advance in the printer 1 may be used to make changes including the replacement described above.

In addition, in the present embodiment, in S160, S170, or S190, which are executed at a timing later than the timing at which the drive signal pattern is installed in the sub-pattern storage 53A in S40, the previously set drive signal pattern is changed to the drive signal pattern obtained in S40. According to the present embodiment, the drive signal pattern obtained from the external device 150 through communication can be used to provide an optimized printing service corresponding to the contract.

In the present embodiment, when it is determined that the print volume exceeds the threshold in S150 or when it is determined that the dot count as ink usage exceeds the threshold in S180, the previously set drive signal pattern is changed to another drive signal pattern corresponding to the contract (see S170 and S190). According to this system, the drive signal pattern can be switched to one corresponding to the contract when a large amount of printing is performed by the user.

According to the present embodiment, when the ink cartridges 32 are attached to the cartridge holder 35, the type of the attached ink cartridges 32 is identified in S50. Thereafter, in S60, it is checked whether the type of the identified ink cartridges 32 matches the type of the ink cartridge to be installed in the cartridge holder 35 according to the contract information. When the type of the attached ink cartridges 32 is different from the type of the ink cartridge 32 corresponding to the contract, a warning notification is made in S70. According to the present embodiment, the user can be made aware that inappropriate ink cartridges 32 are installed in the cartridge holder 35.

In the present embodiment, the cartridge type information is stored in the cartridge memory 65 of the ink cartridge 32. In S50, the cartridge type information stored in the cartridge memory 65 is retrieved, and the aforementioned matching is performed in S60. According to the present embodiment, matching can be performed with high accuracy and certainty based on the cartridge type information stored on the ink cartridge 32 side.

In the present embodiment, an instruction to the effect that the change to the low ejection amount pattern is accepted is received from the external device 150, which is, for example, a server of the manufacturer/seller of the printer 1, a server of the printing service provider, or a user's information terminal (see S165 and S185). Then, the reception of the instruction triggers S170 and S190 to change the originally set drive signal pattern to a different drive signal pattern corresponding to the contract. According to the present embodiment, changes in the drive signal pattern can be executed based on the operation of the external device 150, and an optimized printing service can be provided.

When the drive signal pattern changed in S170 and S190 is set based on the instructions obtained in response to the user's appropriate operation on the operation panel of the printer 1 in S165 and S185, consequently, the change of the drive signal pattern can be executed based on the operation of the operation panel of the printer 1 and an optimized printing service can be provided.

Modified Embodiments

The present disclosures are not necessarily limited to the configuration of the above embodiment, but various modifications are possible without departing from aspects of the present disclosures. Such modifications will be described below. It is noted that components equivalent to the above embodiment are assigned with the same reference numerals, and descriptions thereof are omitted or simplified as appropriate.

(1) Example of Drive signal Pattern Based on Droplet Size

The above drive signal patterns may be classified into four types according to the total volume of ink droplets: large droplets, medium droplets, small droplets, and micro droplets. The drive signal patterns for large, medium, small, and micro droplets are shown in FIG. 5A to FIG. 5D.

Figure 5A:
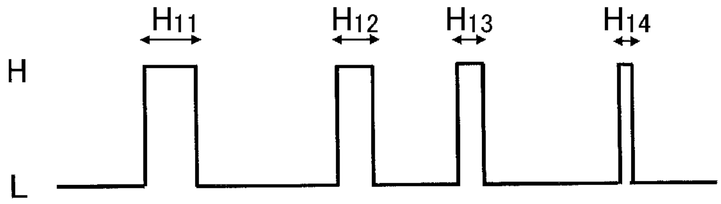
FIGS. 5A-5D show drive signal patterns for large, medium, small, and micro drops, respectively.

FIG. 5A shows the drive signal pattern for a large droplet. This drive signal pattern includes four high-level periods, i.e., the aforementioned pressure chamber volume expansion periods, and low-level periods before and after the high-level periods, i.e., the aforementioned pressure chamber volume reduction periods. After the end of the first three high-level periods H11, H12, and H13, each of which is an ejection pulse, an ink droplet (e.g., 12*p*1 in volume) is ejected from each of the 10 nozzles in accordance with the abovementioned pulling-and-shooting method, and a large dot is formed on the recording sheet P as the three ink droplets overlap thereon. Then, in the fourth high-level period H14, which is a cancellation pulse, ink is not ejected from the nozzle 10, but the residual ink pressure fluctuation in the pressure chamber is canceled out. In this way, the next ink ejection is not adversely affected.

Figure 5B:
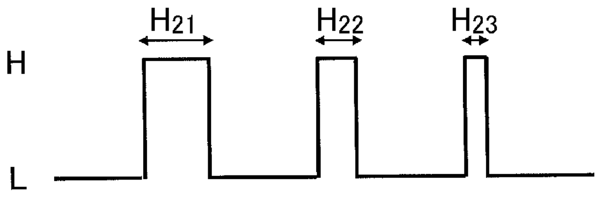

FIG. 5B shows the drive signal pattern for a medium droplet. This drive signal pattern includes three high-level periods and low-level periods before and after the high-level periods. After the end of the first two high-level periods H21 and H22, each of which is an ejection pulse, an ink droplet (e.g., 12*p*1 in volume) is ejected from the nozzle 10 in accordance with the pulling-and-shooting method, and a medium dot is formed on the recording sheet P ad the two ink droplets are overlapped thereon. Then, in the third high level period H23, which is a cancellation pulse, ink is not ejected from the nozzle, but the residual ink pressure fluctuation in the pressure chamber is canceled out.

Figure 5C:
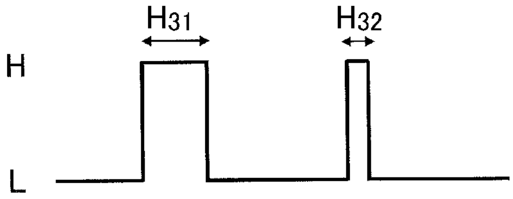

FIG. 5C shows the drive signal pattern for the small droplet. This drive signal pattern includes two high-level periods and low-level periods before and after the two high-level periods. After the end of the first high-level period H31, which is the ejection pulse, a small dot is formed on the recording sheet P by ejecting a drop of ink (e.g., 12 pl in volume) from the nozzle 10 by the pulling-and-shooting described above. Then, in the second high-level period H32, which is a cancellation pulse, ink is not ejected from the nozzle, but the residual ink pressure fluctuation in the pressure chamber is canceled out.

Figure 5D:
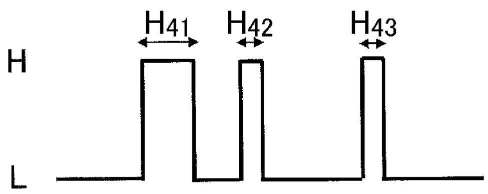

FIG. 5D shows the drive signal pattern for the micro droplet. This drive signal pattern includes three high-level periods and a low-level period before and after the high-level periods. After the end of the first high-level period H41, which is the ejection pulse, an ink droplet (e.g., 12*p*1 in volume) is about to be ejected from the nozzle 10 by the pulling-and-shooting method described above. However, a part of the back end of the ink droplet about to be ejected from the nozzle 10 is pulled into the nozzle due to the second high-level period H42, which is a retraction pulse, in a relatively short time. Accordingly, the volume of ink droplets actually ejected from the nozzle 10 is, for example, about 5 pl, resulting in the formation of micro drop on the recording sheet P. Then, in the third high-level period H43, which is a cancellation pulse, ink is not ejected from the nozzle, but the residual ink pressure fluctuation in the pressure chamber is canceled out.

In the method of changing the drive signal pattern according to the contract content, an example of the association of the contract with the above drive signal patterns for the large droplets, the medium droplet, and the small droplet is shown in FIG. 6. In this example, three drive signal patterns a, p, and x that are different from each other are provided as drive signal patterns for the small droplets, three drive signal patterns b, q, and y that are different from each other are provided as drive signal patterns for the medium droplets, and three drive signal patterns c, r, and z that are different from each other are provided as drive signal patterns for the large droplets. That is, the nine drive signal patterns a through c, p through r, and x through z are different from each other.

In the example in FIG. 6, when contract I is concluded, the drive signal pattern a is set for the small droplet, the drive signal pattern b is set for the medium droplet, and the drive signal pattern c is set for the large droplet. When contract II is concluded, the drive signal pattern p is set for the small droplet, the drive signal pattern q is set for the medium droplet, and the drive signal pattern r is set for the large droplet. When contract III is concluded, the drive signal pattern x is set for the small droplet, the drive signal pattern y is set for the medium droplet, and the drive signal pattern z is set for the large droplet.

FIG. 7 also shows another example of the association. In this example, the contract is associated with the drive signal patterns for the large droplet, the medium droplet, the small droplet, and the micro droplet. In the example shown in FIG. 7, one drive signal pattern g is provided as the drive signal pattern for the small droplet, one drive signal pattern h is provided as the drive signal pattern for the medium droplet, and one drive signal pattern i is provided as the drive signal pattern for the large droplet. In addition, one drive signal pattern s is provided as a drive signal pattern for the micro droplet. The four drive signal patterns, g, h, i, and s, are different from each other.

In the example shown in FIG. 7, when contract IV is concluded, the drive signal pattern g is set for the small droplet, the drive signal pattern h is set for the medium droplet, and the drive signal pattern i is set for the large droplet. When the contract V is concluded, the drive signal pattern s is set for the small droplet, and the same drive signal patterns g and h as in contract IV are set for the small droplet, the medium droplet, and the large droplet, respectively. That is, in this example, among the drive signal patterns g, h, i, and s prepared in advance, the pattern to be used is recombined for each contract.

In the above modification shown in FIGS. 6 and 7, as described above, the drive signal pattern selected according to the contract content among the drive signal patterns prepared in advance in the printer 1 is set as the drive signal pattern to be used for printing, thereby achieving the same effect as the above embodiment.

In the case where drive signal patterns for the large, the medium, the small, and the micro droplets are prepared as shown in FIG. 6 or FIG. 7, when the dot count exceeds the aforementioned threshold value (S180: YES) of FIG. 4, for example, the size of the droplet may remain the same but the spacing between the droplets may be widened in S190 to make the overall distribution sparse, or the drive signal pattern may be made smaller.

(2) When Default Pattern is not Prepared

The above description is based on an example where a default pattern is provided in the default pattern storage MA of the EEPROM 54 of the printer 1, and the default pattern is retained unchanged even when the drive signal pattern is set according to the contract. However, the configuration is not necessarily limited to the above. For example, when the printer 1 is a model that does not have a large memory capacity, the default pattern does not need to be provided. In such a case, each time printing is performed based on a contract, the corresponding drive signal pattern may be obtained from an external device, stored in the sub-pattern storage 53A of RAM 53, and set as the drive signal pattern to be used in printing.

(3) When Drive Signal Pattern Is Changed By Operation Of The Printer's Operation Panel.

In the above-described embodiment, after the contract is concluded and the contract content is identified in S20, when the printing volume exceeds the threshold in S150 and S180, the drive signal pattern is changed after the instruction indicating that the change of the drive signal pattern is agreed in S165 and S185. However, the configuration is not necessarily limited to the above. That is, even in cases other than the case where the printing volume exceeds the threshold in S150 and S180 above, when setting the drive signal pattern in S130, S160, S170, or S190, the setting may always be triggered in response to receipt of the same instruction as above. In this case, as mentioned above, changes in the drive signal pattern can be executed based on the operation of the external device 150 to provide an optimized printing service. It is noted that, when setting the drive signal pattern in S130, S160, S170, or S190, the setting may always be triggered in response to receipt of the instruction corresponding to an operation on the operation panel provided to the printer 1. In such a case, the change of the drive signal pattern can be executed based on the operation of the operation panel of the printer 1 to provide the optimized printing service.

Alternatively, the drive signal pattern may be changed based on both the receipt of an instruction from the external device 150 as described above and, in addition to this, the obtaining of an instruction corresponding to the operation of the operation panel described above. In this case, the change of drive signal pattern can be executed based on the operation of the external device 150 and the operation of the operation panel of the printer 1 to provide an optimized printing service.

(4) Others

In the preceding description, cases where the ink cartridges 32 detachably attached to the cartridge holder 35 are used as the containers are described. However, the configuration is not necessarily limited to such a configuration. That is, tanks that are fixedly installed to the printer 1 and store ink inside may be used as the above container. It is noted that the flowcharts shown in FIGS. 3 and 4 do not limit the aspects of the present disclosures to the procedures shown in the above flowcharts, but the procedures may be added, deleted, or modified in any order without departing from aspects and/or technical concepts according to the present disclosures.

In addition to what has already been described above, the methods/configurations described in the above embodiment and each modification may be used in combination as appropriate.

Although not described individually anymore, configurations according to the present disclosures may be implemented with various changes within aspects of the present disclosures.

It is noted that the printer 1 is an example of a printing device, the carriage 2 and the inkjet head 3 constitute an example of a print engine, and the inkjet head 3 is an example of an ejection head. Further, the ink cartridges 32 are examples of a container and the cartridge holder 35 is an example of a holder. The recording sheet P is an example of recording media. The CPU 51 of the controller 50 is an example of a controller, and the EEPROM 54 and the RAM 53 are examples of a first storage. The cartridge memory 65 is an example of a second storage and the cartridge type information is an example of container type information.

The timing after the contract contents are identified in S20 until S40 is executed is an example of a first timing, and the process executed by CPU 51 in S40 is an example of a signal pattern obtaining process. The process executed by the CPU 51 in S50 is an example of a container identification process.

The process executed by the CPU 51 in S60 is an example of a container matching process. The operation by the user to indicate agreement to the change to the low ejection amount pattern is an example of a pattern changing operation, and a process performed by the CPU 51 to obtain the user's agreement is an example of a change operation receiving process.

The instruction obtained in response to the operation of the operation panel in S165 is an example of a pattern change instruction, and the process executed by the CPU 51 in S165 in that case is an example of a change instruction receiving process.

The timing at which S170 is executed is an example of a second timing. The other drive signal pattern having been set when the process proceeds from S140 to S170, is an example of a first drive signal pattern, and the low ejection amount pattern is an example of a second drive signal pattern. The dot count is an example of the ink usage amount.

As in S165, the above instruction obtained in S185 is an example of a pattern change instruction, and the process executed by the CPU 51 in S185 is an example of a change instruction receiving process. The instruction obtained in response to the operation of the operation panel in S185 is an example of a pattern change instruction as described above, and in that case, the process executed by the CPU 51 in S185 is an example of a change instruction receiving process.

The timing at which this S190 is executed is an example of a second timing. Further, the high printing volume pattern before the affirmative decision is made in S180 is an example of a first drive signal pattern, and the low ejection amount pattern set in S190 is an example of a second drive signal pattern.

It should be noted that the processes executed by the CPU 51 in S130, S160, S170, and S190 are examples of a change command receiving process and also a signal pattern setting process. In addition, the processes in S130, S160, S S130, S160, S170, and S190 are also examples of a signal pattern setting step.

What is claimed is:

1. A printing device, comprising:

a print engine provided with an ejection head configured to eject ink introduced from a container containing the ink and configured to perform printing using the ink in accordance with a drive signal pattern defining an ink ejection pattern to drive the ejection head on a recording sheet; and a controller, wherein the controller is configured to perform:

automatically setting a drive signal pattern to a first drive signal pattern defining a first ejection amount pattern to be used in accordance with contract information defining which one of a plurality of contracts is concluded;

determining a particular parameter and a threshold amount therefor based on the contract information;

in response to the controller detecting that the particular parameter exceeds the threshold amount, generating a notification indicating a reduced ejection amount of ink in comparisonas compared with an amount of ink ejected using the first drive signal pattern, determining whether an instruction is received agreeing to the reduced ejection amount of ink has been received, and in response to the instruction agreeing to the reduced ejection amount of ink being received, changing the first drive signal pattern to a second drive signal pattern defining a second ejection amount pattern for the reduced ejection amount of ink;

determining whether a new contract has been concluded;

in response to determining that a new contract has been concluded:

identifying which one of a plurality of contracts has been concluded, the identified one of the plurality of contracts being defined by contract information;

identifying the first drive signal pattern based on the contract information;

identifying a type of container attached to a holder of the printing device;

determining whether the identified type of the container is compatible with the identified contract based on the contract information; and in response to determining that the identified type of the container is compatible with the identified contract based on the contract information, changing the first drive signal pattern to the second drive signal pattern.

2. The printing device according to claim 1, further comprising a first storage configured to store at least one type of the drive signal pattern in advance, wherein, in the setting, the controller is configured to perform changing the signal pattern such that a default drive signal pattern stored in the first storage in advance is automatically changed to the first drive signal pattern corresponding to the contract information.

3. The printing device according to claim 2, wherein the default drive signal pattern is fixedly set regardless of the contract information and the first drive signal pattern different from the default drive signal pattern are stored in the first storage, and wherein the controller is configured to change the first drive signal pattern to the second drive signal pattern without changing the default drive signal pattern that has been stored, in advance, in the first storage.

4. The printing device according to claim 3, further comprising a communication interface configured to communicate with an external device, wherein the controller is configured to perform obtaining the second drive signal pattern from the external device by a communication via the communication interface.

5. The printing device according to claim 4, wherein the controller is configured to perform changing the first drive signal pattern to the second drive signal pattern at a particular second timing that is later than a particular first timing at which a contract corresponding to the contract information was concluded.

6. The printing device according to claim 1, wherein the controller is further configured to perform:

identifying a type of the container attached to the holder of the printing device;

determine whether the type of the container identified in the identifying matches a type of the container to be attached to the holder based on the contract information.

7. The printing device according to claim 6, wherein the controller is configured to perform the identifying by obtaining container information stored in a second storage provided to the container.

8. The printing device according to claim 4, wherein the controller is further configured to perform:

receiving a pattern change instruction from the external device via the communication interface; and changing the first drive signal pattern to the second drive signal pattern in response to the pattern changing instruction received in the receiving.

9. The printing device according to claim 2, further comprising an operation panel configured to be operated by a user, wherein the controller is further configured to perform:

receiving a particular pattern changing operation input via the operation panel; and changing the default drive signal pattern to the first drive signal pattern in response to receipt of the pattern changing operation input via the operation panel.

10. The printing device according to claim 4, further comprising an operation panel configured to be operated by a user, wherein the controller is further configured to perform:

receiving a pattern changing instruction from the external device via the communication interface;

receiving a particular pattern changing operation input through the operation panel, and changing the first drive signal pattern to the second drive signal pattern in response to receipt of the pattern changing instruction via the communication interface and the pattern changing operation input through the operation panel.

11. A non-transitory computer-readable recording medium for a printing device equipped with a print engine provided with an ejection head configured to eject ink introduced from a container containing the ink and configured to perform printing using the ink in accordance with a drive signal pattern defining an ink ejection pattern to drive the ejection head on a recording sheet, and a controller, the non-transitory computer-readable recording medium containing computer-executable instructions which cause, when executed by the controller, the printing device to perform:

automatically setting a drive signal pattern to a first drive signal pattern defining a first ejection amount pattern to be used in accordance with contract information defining which one of a plurality of contracts is concluded for the printing device or for a use by a user of the printing device;

determining a particular parameter and a threshold amount therefor based on the contract information;

in response to the controller detecting that the particular parameter exceeds the threshold amount, generating a notification indicating a reduced ejection amount of ink as compared with an amount of ink ejected using the first drive signal pattern, determining whether an instruction is received agreeing to the reduced ejection amount of ink has been received, and in response to the instruction agreeing to the reduced ejection amount of ink being received, changing the first drive signal pattern to a second drive signal pattern defining a second ejection amount pattern for reducing an ejection amount of ink in comparison with the first drive signal pattern;

determining whether a new contract has been concluded; and in response to determining that a new contract has been concluded:

identifying which one of a plurality of contracts has been concluded, the identified one of the plurality of contracts being defined by contract information; and identifying the first drive signal pattern based on the contract information;

identifying a type of container attached to a holder of the printing device; and determining whether the identified type of the container is compatible with the identified contract based on the contract information; and in response to determining that the identified type of the container is compatible with the identified contract based on the contract information, changing the first drive signal pattern to the second drive signal pattern.

12. The non-transitory computer-readable recording medium according to claim 11, wherein the printing device provided with a first storage configured to store at least one type of the drive signal pattern in advance, and wherein the instructions further cause, when executed by the controller, the printing device to perform, in the setting, changing the signal pattern such that a first drive signal pattern stored in the first storage in advance is automatically changed to a second drive signal pattern corresponding to the contract information.

13. The non-transitory computer-readable recording medium according to claim 12, wherein a default drive signal pattern that is fixedly set regardless of the contract information and the first drive signal pattern different from the default drive signal pattern are stored in the first storage, and wherein the instructions further cause, when executed by the controller, the printing device to perform, changing the first drive signal pattern to the second drive signal pattern without changing the default drive signal pattern that has been stored, in advance, in the first storage.

14. The non-transitory computer-readable recording medium according to claim 12, wherein the printing device is provided with a communication interface configured to communicate with an external device, and wherein the instructions further cause, when executed by the controller, the printing device to perform obtaining the second drive signal pattern from the external device by a communication via the communication interface.

15. The non-transitory computer-readable recording medium according to claim 11, wherein the instructions further cause, when executed by the controller, the printing device to perform:

identifying a type of the container attached to the holder of the printing device;

determine whether the type of the container identified in the identifying matches a type of the container to be attached to the holder based on the contract information.

16. The non-transitory computer-readable recording medium according to claim 15, wherein the instructions further cause, when executed by the controller, the printing device to perform the identifying by obtaining container information stored in a second storage provided to the container.

17. The printing device according to claim 1, wherein when the concluded contract is a period-based billing contract, the particular parameter includes a number of printed pages.

18. The printing device according to claim 1, wherein when the concluded contract is a quantity-based billing contract, the particular parameter includes a dot count of print data about to be printed.

19. The printing device according to claim 11, wherein when the concluded contract is a period-based billing contract, the particular parameter includes a number of printed pages.

20. The printing device according to claim 11, wherein when the concluded contract is a quantity-based billing contract, the particular parameter includes a dot count of print data about to be printed.

21. The printing device according to claim 18, wherein when a quantity-based billing contract is concluded, the controller is configured to set the drive signal pattern to the second ejection amount pattern in response to the ejection amount of ink exceeding the threshold amount based on the dot count.

22. The non-transitory computer-readable recording medium according to claim 20, wherein the instructions further cause, when executed by the controller, the printing device to set the drive signal pattern to the second ejection amount pattern in response to the ejection amount of ink exceeding the threshold amount based on the dot count.

23. The printing device according to claim 17, wherein the controller is configured to set the drive signal pattern to the second ejection amount pattern in response to the number of printed recording sheets exceeding the threshold amount.

24. The non-transitory computer-readable recording medium according to claim 19, wherein the instructions further cause, when executed by the controller, the printing device to set the drive signal pattern to the second ejection amount pattern in response to a number of printed recording sheets exceeding a threshold amount.

* * * * *